United States Patent [19]
Baba et al.

[11] 3,994,188
[45] Nov. 30, 1976

[54] WIRE STRAND TWISTING APPARATUS FOR AN INSULATED WIRE CUTTING AND STRIPPING MACHINE

[75] Inventors: Tsutomu Baba, Kawanishi; Satomi Yamamoto, Amagasaki, both of Japan

[73] Assignee: Shin Meiwa Industry Co., Ltd., Nishinomiya, Japan

[22] Filed: July 10, 1975

[21] Appl. No.: 594,687

[30] Foreign Application Priority Data
July 16, 1974 Japan.............................. 49-81917

[52] U.S. Cl..................................... 81/9.51; 140/1
[51] Int. Cl.² ...................... H02G 1/12; B21F 7/00; B21F 21/00
[58] Field of Search........ 29/33 M; 81/9.5 R, 9.5 A, 81/9.51; 140/1, 149

[56] References Cited
UNITED STATES PATENTS

| | | |
|---|---|---|
| 3,368,428 | 2/1968 | Gudmestad............................ 81/9.51 |
| 3,376,627 | 4/1968 | Sitz....................................... 81/9.51 |
| 3,521,508 | 7/1970 | Kamimura et al. ................... 81/9.51 |
| 3,857,306 | 12/1974 | Gudmestad............................ 81/9.51 |
| 3,881,374 | 5/1975 | Gudmestad............................ 81/9.51 |

Primary Examiner—C.W. Lanham
Assistant Examiner—E. M. Combs
Attorney, Agent, or Firm—W. G. Fasse; W. W. Roberts

[57] ABSTRACT

An apparatus for cutting an insulated wire, stripping the end thereof and twisting the wire strands, comprises an insulated wire intermittent supply, cutting blades driven to cut the wire during the stoppage of the wire supply and returned immediately thereafter. Front and rear stripping blades are driven to cut only the insulation of the wire at positions spaced forwardly and rearwardly of the wire cutting position and returned after a predetermined period after return of the cutting blades. A pair of front insulation rotating bars are driven to contact the insulation rearward of the front insulation cutting position and moved in the opposite directions to rotate the insulation thereof while the cut wire length is forcibly moved in the supply direction thereof, whereby the end of the cut wire length is stripped and the strands thereof are twisted. A pair of rear insulation rotating bars is driven to contact the insulation forward of the rearward insulation cutting position and moved in the opposite directions to rotate the insulation thereof while the supplied wire is forcibly moved in the direction opposite to the supply direction thereof, whereby the end of the wire is stripped and the strands thereof are twisted.

7 Claims, 11 Drawing Figures

WIRE STRAND TWISTING APPARATUS FOR AN INSULATED WIRE CUTTING AND STRIPPING MACHINE

BACKGROUND OF THE INVENTION

1. Field of the Invention

The present invention relates to an apparatus for twisting the wire strands at the end of an insulated wire. More specifically, the present invention relates to an improved apparatus for twisting the wire strands at the end of an insulated wire, for use in a machine for cutting an insulated wire into predetermined lengths and stripping the insulation from the opposite ends of the cut lengths.

2. Description of the Prior Art

Heretofore, an arrangement has been disclosed in which pairs of stripping blades are integrally disposed on opposite sides of a pair of cutting blades, each pair being adapted to effect a cutting action by the opening and closing movement of the opposed blades of the pair, the stripping of the insulation being effected by the wire drawing action of a separate clamping device. Further, there has been proposed another arrangement in which the cut insulation refuse is rotated in operative association with said insulation stripping action, thereby effecting the twisting of the wire strands concurrently with the removal of the insulation. In this case, however, the rotation of the cut insulation refuse nipped by the spaced pairs of stripping blades is disadvantageous since a high resistance is encountered, often causing slip so that it has been impossible to impart a sufficient twist to the wire strands.

SUMMARY OF THE INVENTION

With the above described situation in mind, the present invention is concerned with a wire strand twisting apparatus for use with an insulated wire cutting and stripping machine and provides an arrangement in which the cutting blades and stripping blades are adapted to be synchronously operated by individual mechanism only when they are actuated for closing. Wire twisting units are disposed between the pair of cutting blades and the pairs of stripping blades are disposed on opposite sides of the wire for rotating the cut insulation refuse concurrently with the extraction of said cut insulation refuse, the cutting blades alone being actuated for opening prior to the operation of said twisting units so as to enable the cut insulation refuse to be rotated in an unobstructed condition to effect a sufficient twisting of the wire strands.

BRIEF DESCRIPTION OF THE DRAWINGS

The drawings illustrate an example embodiment of the present invention.

DESCRIPTION OF THE PREFERRED EMBODIMENTS

Figure 1:
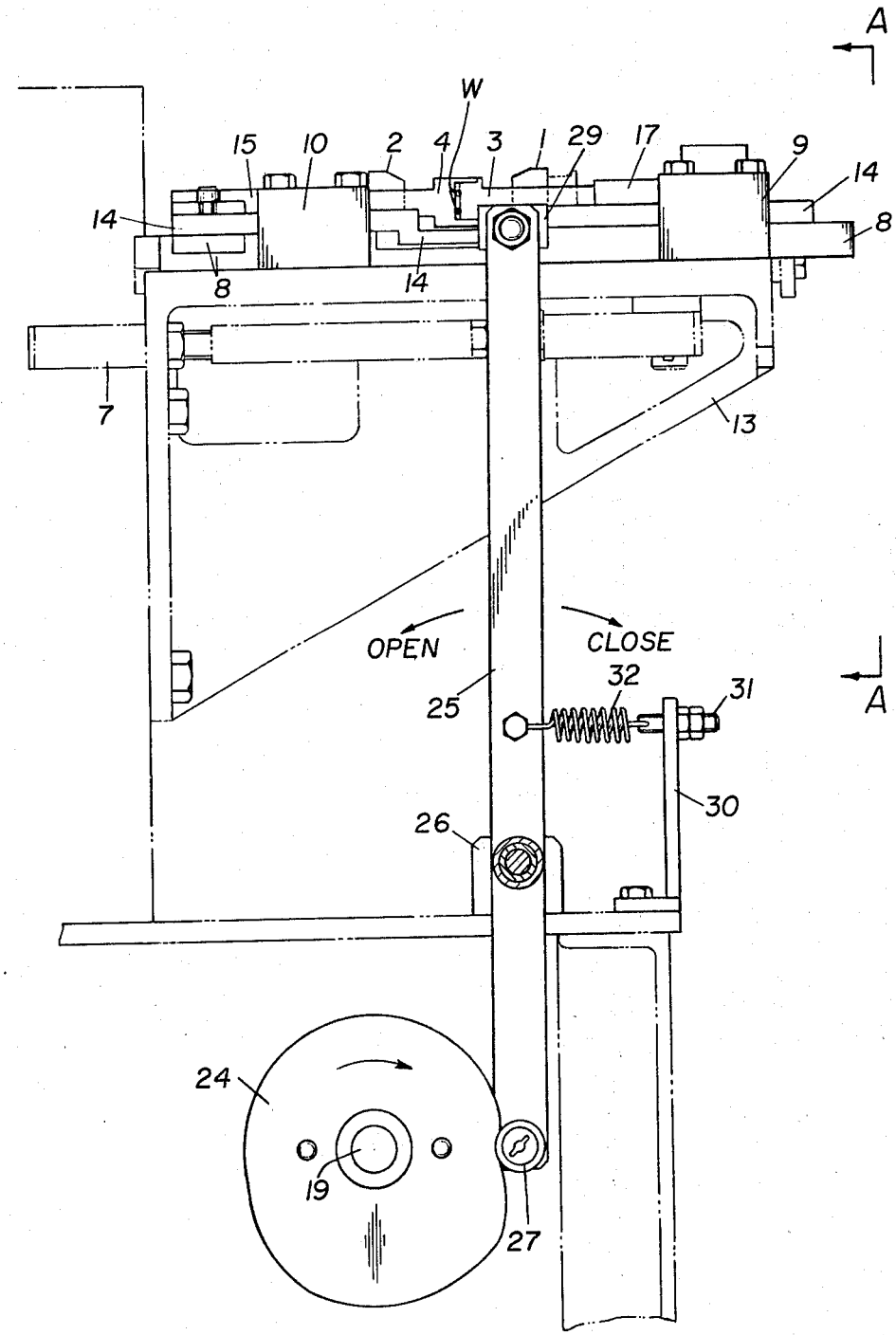
FIG. 1 is a front view thereof.

The present invention will now be described in more detail with reference to the accompanying drawings illustrating an example embodiment thereof.

The reference characters 1 and 2 designate front and rear slides having integrally fixed thereto stripping blades 5 and 6 which are disposed on opposite sides of opposed cutting blades 3 and 4 in such a manner that the spacing therebetween can be adjusted. Thus, said two slides 1 and 2 are disposed on opposite sides of the wire drawing axis. The rear slide 2 is joined to the front end of the short leg of an L-shaped rack 8 which is reciprocably slidable when actuated by a suitable linkage 7 operatively connected to a cam or the like mounted on the machine side, said rack 8 being guided by guides 9 and 10 and meshing with a pinion 11 housed in said guide 9, said pinion, in turn, meshing with a rack portion 12 formed on the side of the front slide 1, so that the actuation of said linkage 7 causes the front and rear slides 1 and 2 to slide on a bracket 13 in opposite directions relative to each other to effect the opening and closing of the stripping blades 5 and 6. The cutting blade 4 of said pair of cutting blade 3 and 4 is fixed through a holder 15 to the tip of the short leg of a wire cutting L-shaped rack 14 overlying the L-shaped rack 8. The rack 14 is guided in such a manner that it is slidable independently of the L-shaped rack 8. Further, said L-shaped rack 14 meshes with a pinion 16 inside the guide 9, said pinion 16, in turn, meshing with a rack 18 to which is fixed the cutting blade 3 through a holder 17 on the front slide 1, so that the sliding movement of the L-shaped rack 14 causes the opening and closing of the cutting blades 3 and 4.

A drive transmission shaft, designated by 19, is supported by brackets 21 and 22 depending from the lower surface of a platform 20 disposed below the bracket 13 and is driven from the machine through a sprocket 23 fixed to said shaft at the central portion thereof. The character 24 designates a first cam fixed on the drive transmission shaft 19, and 25 designates a lever swingably supported at the medial portion thereof by brackets 26 mounted on the platform 20, said lever carrying at the lower end thereof a cam follower 27 engaging the first cam 24 and at the upper end thereof a pusher roller 28 fitted in a recess in a bracket 29 projecting from the side of the L-shaped rack 14. Further, said lever 25 is biased by a tension spring 32 which is interposed between the medial portion of said lever and an L-shaped bracket 30 mounted on the platform 20 and whose tension is adjusted by an adjusting screw 31 so that the cam follower 27 is urged against the first cam 24 at all times. Therefore, the rotation of the first cam 24 causes the L-shaped rack 14 to slide, enabling the cutting blades 3 and 4 alone to open and close.

The characters 33, 34, 35 and 36 designate wire twisting bars disposed on opposite sides of the insulated wire w between the cutting blades 3 and 4 and the stripping blades 5 and 6 and swingably connected by eccentric pins 44 to the upper ends of two pairs of racks 40, 41 and 42, 43 opposed to each other on opposite sides of pinions 38 and 38' and rollers 39 and 39' within a box-type stand 37 mounted on the platform 20. Further, said wire twisting bars 33–36, in their upper regions, are fitted in the grooves of grooved rollers 45 disposed inwardly of the front and rear slides 1 and 2 so that upon closing of the slides 1 and 2, the wire twisting bars grip the insulated wire w and upon opening of the slides 1 and 2, they are opened, while the grooved rollers 45 are retracted, by the action of torsion springs 46 and 47 to move between the lower ends of the wire twisting bars and the racks 40-43. Further, the racks 40 and 42 alone have links 49 and 50 connected to the lower ends thereof by pins 48, the lower ends of said links 49 and 50 being connected to the medial portions of levers 52 and 53 pivotally supported at one of their respective ends by a bracket 51 attached to the lower surface of the platform 20. The levers 52 and 53 carry cam followers 54 and 55 at their medial portions which engage second and third cams 56 and 57, respectively, fixed on the drive transmission shaft 19, with tension springs 59 provided between the tips of said levers and suitable locations on the platform 20 for urging said cam followers 54 and 55 against the second and third cams 56 and 57 at all times.

The function of the apparatus will now be described.

Figure 2:
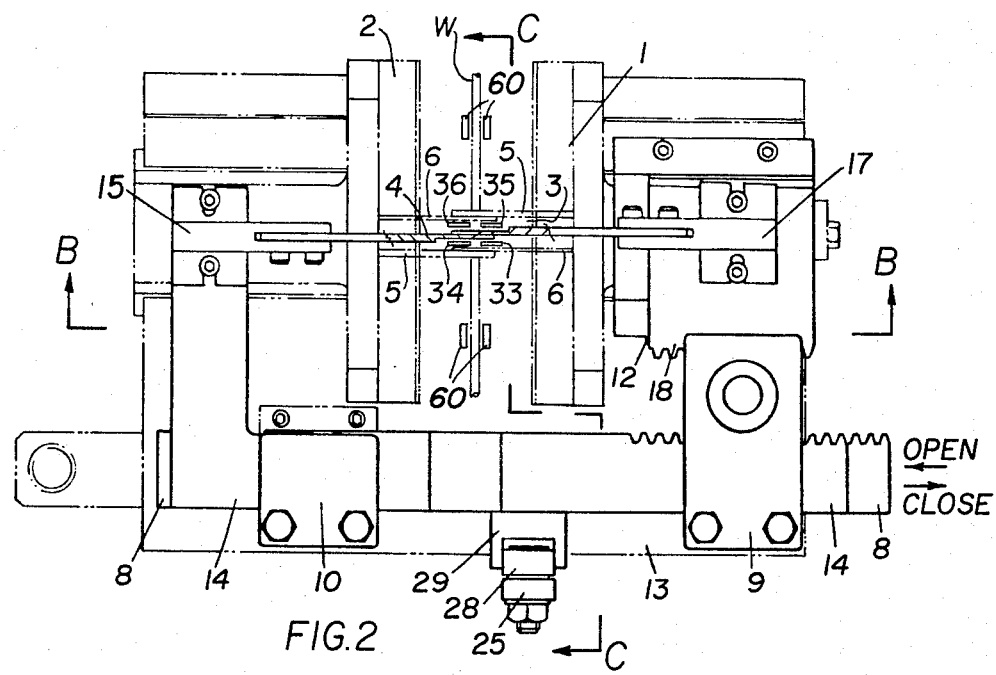
FIG. 2 is a plan view thereof.
Figure 3:
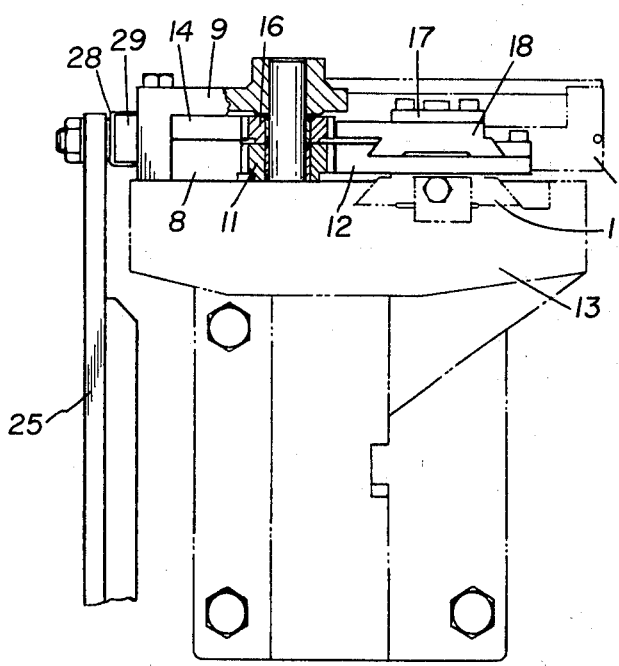
FIG. 3 is a view thereof taken in the direction of arrow A—A in FIG. 1,
FIGS. 4 and 5 are sections thereof along B—B and C—C, respectively, in FIG. 2.
Figure 6:
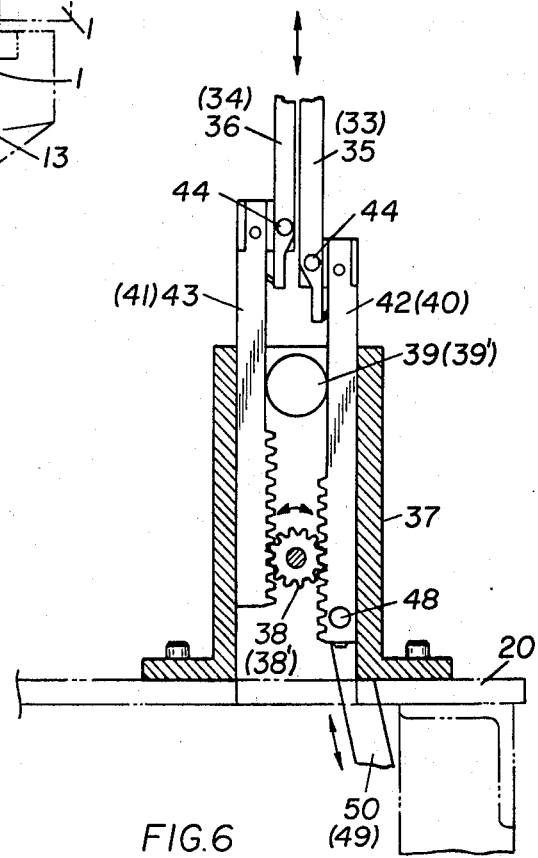
FIG. 6 is a section thereof along D—D in FIG. 5,
FIGS. 7 and 8 show that only the cutting blades shown in FIGS. 1 and 2 are opened.
Figure 4:
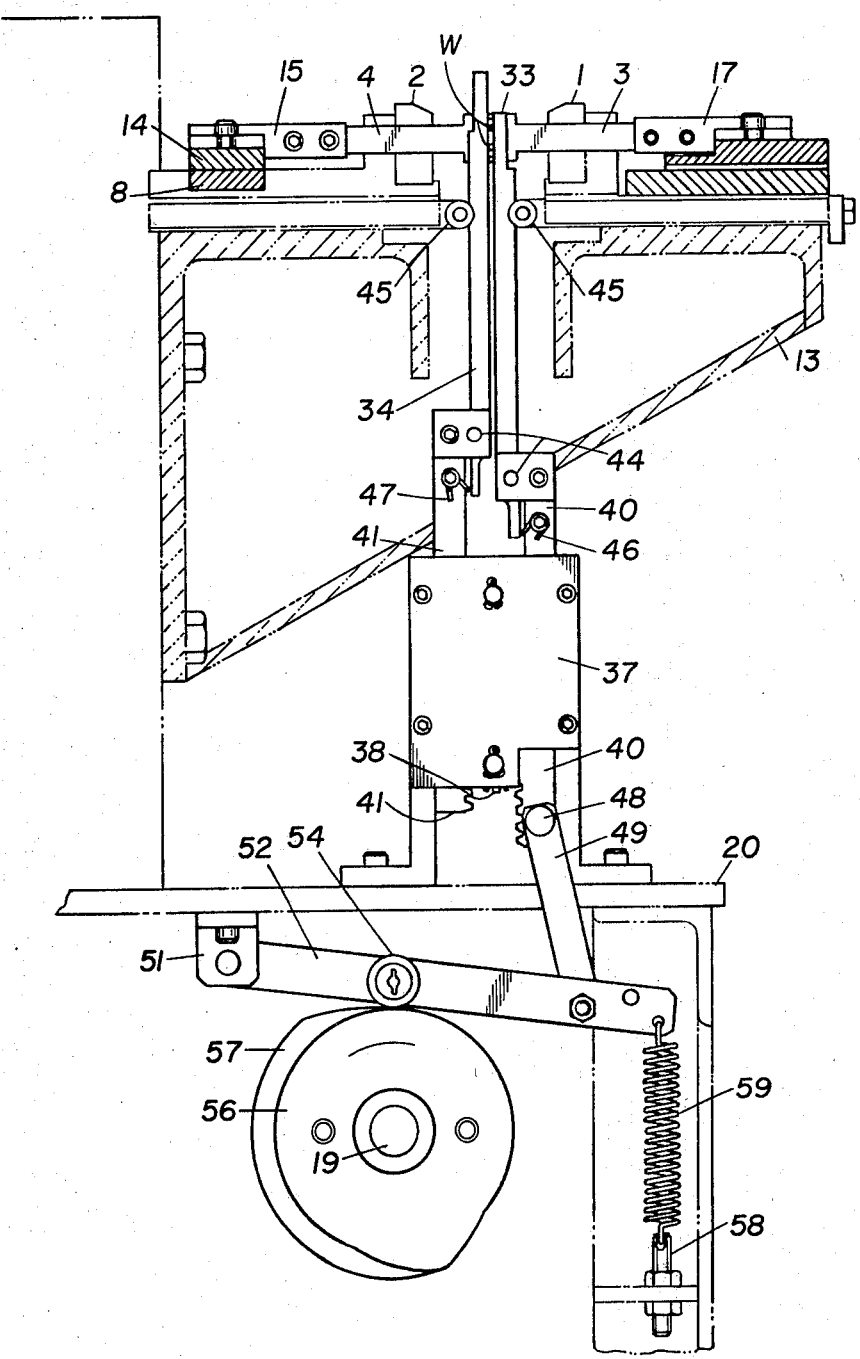
Figure 5:
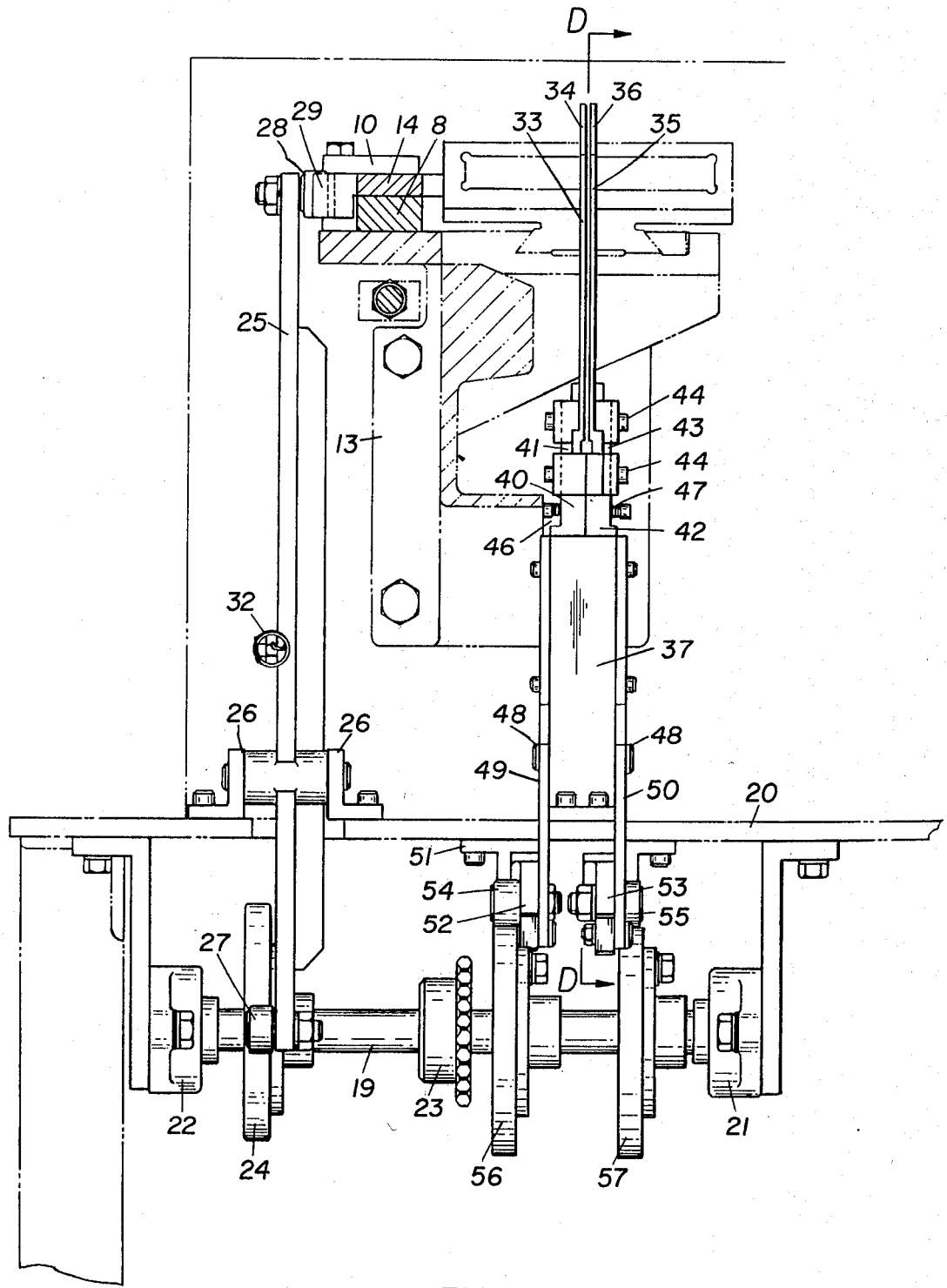
Figure 8:
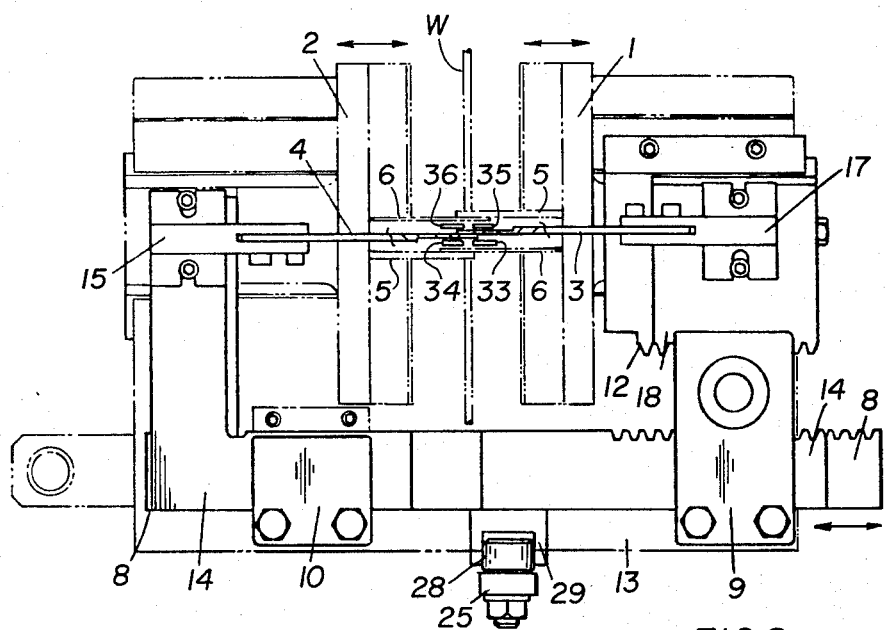
Figure 7:
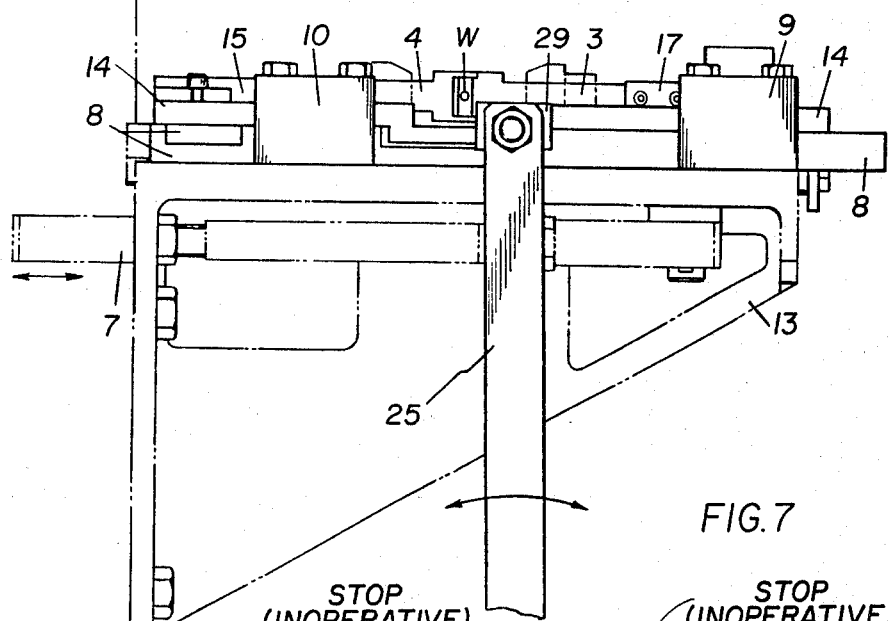
Figures 9, 10, 11:
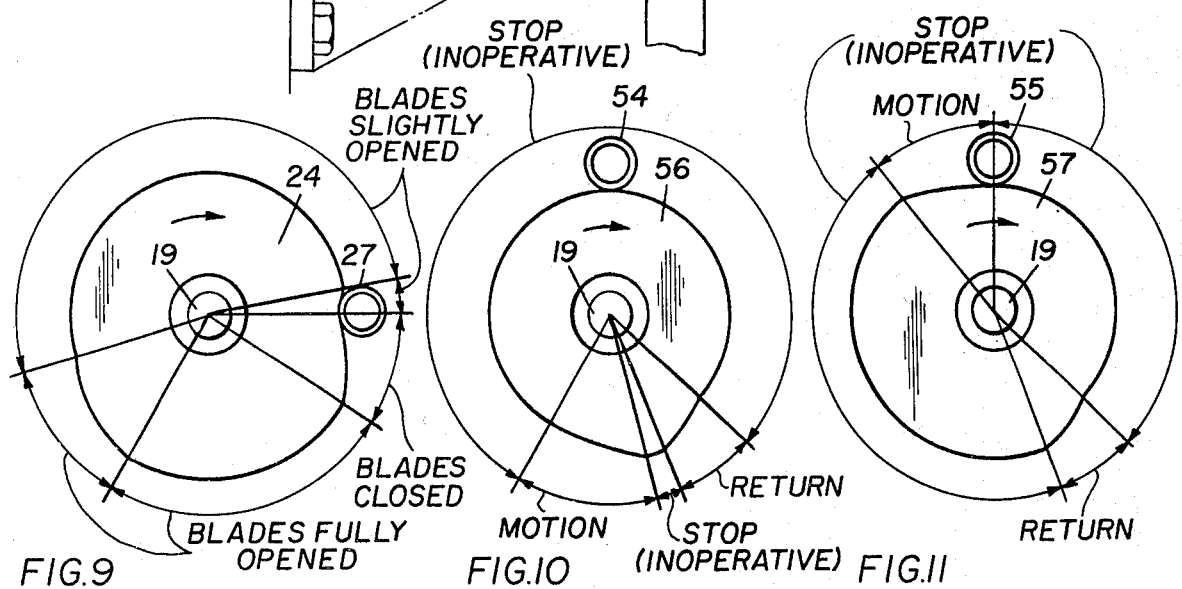
FIGS. 9–11 are explanatory views illustrating the working regions of the first, second, and third cams, respectively.

With the cutting blades 3 and 4 and the stripping blades 5 and 6 in their opened position, the insulated wire w is drawn a predetermined length upwardly as viewed in FIG. 2 by a clamping device 60 and when the latter is stopped, the linkage 7 is actuated to move the L-shaped rack 8 to the right as viewed in FIG. 2. As a result, the rear slide 2 connected to the short leg of the L-shaped rack 8 slides to the right while the front slide 1 is slid to the left through the intermediary of the pinion 11 meshing with said rack 8 and the rack portion 12, bringing the stripping blades 5 and 6 to their closed position to cut only the insulation on the insulated wire w. On the other hand, in synchronism with the actuation of the linkage 7, the first cam 24 is rotated to assume its blade closing position as shown in FIG. 1, thereby moving the L-shaped rack 14 to the right as viewed in FIG. 2 through the intermediary of the cam follower 27, lever 25, roller 28 and bracket 29 with the eventual rightward movement of the holder 15 and concurrently moving the holder 17 to the left through the intermediary of the pinion 16 and rack 18. Therefore, the cutting blades 3 and 4 are also closed to cut the insulated wire w. Since the grooved rollers 45 are also moved toward the center along with the movement of the front and rear slides 1 and 2, the insulated wire gripping bars 33, 34 and 35, 36 are moved from their opened position to assume their closed position as shown in FIG. 4, thereby gripping the cut insulation at opposed locations on opposite sides of the point of severance of the insulated wire w. The linkage 7 remains stopped while maintaining the stripping blades 5 and 6 closed, but the rotation of the first cam 24 which is continuously rotating, urges the cam follower 27 to swing the lever 25 to cause the leftward movement of the rack 14 as viewed in FIG. 1, with the result that the cutting blades 3 and 4 alone assume a slightly opened position (as shown in FIGS. 7 and 8). During this phase of operation, the second and third cams 56 and 57 continue to present their inoperative surface sections, so that the wire twisting bars 33-36 remain stopped. However, after said cutting blades 3 and 4 have been slightly opened, the third cam 57 alone begins to operate. Thus, the cam follower 55 is raised to push up the wire twisting bar 35 through the intermediary of the link 50 and rack 42 to concurrently pull down the wire twisting bar 36 through the intermediary of the rack 43 by reason of the operative connection through the pinion 38'. Since the wire twisting bars 35 and 36 have gripped the cut insulation, the upward and downward movements thereof cause the rotation of said cut insulation, imparting a twist to the wire strands surrounded by the cut insulation while the latter is pulled away from the blades by the clamping device 60 in synchronism with the upward and downward movements of the wire twisting bars 35 and 36, with the result that the cut wire length, while being stripped of the cut insulation, is given a uniform twist throughout the bare region thereof. The stripped insulation refuse falls down and since the cut wire length is released from the clamping device, it also falls down. Thereafter, the clamping device, with its legs set apart, is moved across the cutting zone to overlie the insulated wire and grips it and again draws it away from the blades. In this case also, in synchronism with the drawing by the clamping device 60, the second cam 56 begins to operate, as in the preceding case, to push up the wire twisting bar 33 through the intermediary of the cam follower 54, link 49 and rack 40 while concurrently pulling down the wire twisting bar 34 through the intermediary of the rack by reason of the operative connection through the pinion 38. This results in the rotation of the cut insulation gripped by the wire twisting bars 33 and 34, so that the tip portion of the remaining insulated wire w is formed with a twisted bare portion by the pulling action of said clamping device, with the stripped insulation refuse alone falling down. Subsequently, the actuation of the linkage 7 in the opposite direction coupled with the action of the first cam 24 causes the L-shaped racks 8 and 14 to move a greater distance to the left, bringing the cutting blades 3 and 4 and stripping blades 5 and 6 to their fully opened position. During this phase of operation, since the retraction of the front and rear slides 1 and 2 to their opened position causes the retraction of the grooved rollers 45, the torsion springs 46 and 47 cause the wire twisting bars 33-36 to be set apart. Further, since the second and third cams 56 and 57 are rotated with their crests passing by the cam followers 54 and 55, the links 49 and 50 are pulled in directions opposite to their previous movements, thereby returning the wire twisting bars 33-36 to their original positions while maintaining them set apart.

With one complete cycle of the cutting operation thus finished, the next cycle is initiated by the clamping device subsequently clamping the insulated wire w and drawing it while the blades are opened to be ready for cutting, stripping and twisting, thus making it possible to achieve a continuous operation.

With the present apparatus constructed in the manner described above, since a cut insulation length is not rotated with its opposite ends gripped but it is rotated with an unobstructed condition established by opening the stripping blades alone prior to said rotation, it is possible to impart a satisfactory twist to the exposed wire strands by sufficient rotation without causing any slip.

Although the embodiment of the Wire Strand Twisting Apparatus For Insulated Wire Cutting And Stripping Machine in accordance with the present invention has been described in detail, it is to be understood that it is intended to cover all modifications and equivalents of the present invention within the scope of the appended claims.

We claim:

1. An apparatus for cutting an insulated wire into predetermined lengths, stripping the insulation from the opposite ends of the cut lengths and twisting the wire strands, comprising: means for intermittently advancing said insulated wire axially of the latter a predetermined distance, wire cutting means adapted to be driven toward said advancing wire to cut the same at a predetermined position when the wire is stopped to provide the predetermined lengths of said wire, said wire cutting means being further adapted to be driven away from said wire immediately after the cutting of the same, front and rear insulation cutting means adapted to be driven toward said wire to cut substantially only the insulation at spaced positions on opposite sides of the position of severence effected by said wire cutting means when the wire is stopped, said insulation cutting means being further adapted to be driven away from said wire after the lapse of a predetermined period of time after said wire cutting means has been driven away from said wire, first insulation rotating means adapted to be driven, when said wire is stopped, toward the rear end of said cut wire length and to thereby rotate, during the first half of said predetermined period of time, the cut insulation about the axis of said wire, said first insulation rotating means being driven away from said wire after the lapse of said predetermined period of time, means for forcibly moving said cut wire length in the direction of wire advance during the rotating operation of said first insulation rotating means, whereby the portion of the cut insulation at said rear end of said cut wire length is stripped from said cut wire length, while the respective portion of the wire strands stripped of its insulation is simultaneously twisted by the rotation of said portion of the insulation being stripped, second insulation rotating means adapted to be driven, when said wire is stopped, toward the front end of said advancing wire and to thereby rotate, during the second half of said predetermined period of time, the cut insulation of said front end about the axis of said wire, said second insulation rotating means being driven away from the position of said supplied wire after the lapse of said predetermined period of time, and means for forcibly moving said wire in a direction opposite to the direction of wire advance during the rotating operation of said second insulation rotating means, whereby the portion of the cut insulation at said front end of said wire is stripped from said wire, while the respective portion of the wire strands stripped of its insulation is simultaneously twisted by the rotation of said portion of the insulation being stripped whereby a continuous operation is achieved.

2. An apparatus as set forth in claim 1, wherein said wire cutting means comprises;
   a pair of slide members adapted to be driven toward and away from said wire, and
   a pair of cutters mounted on said slide members is opposed relation to each other and to said wire.

3. An apparatus as set forth in claim 1, wherein said insulation cutting means comprises;
   a pair of slide members adapted to be driven toward and away from said wire, and
   a pair of front cutters and a pair of rear cutters, mounted on said slide members in opposed relation to each other and to said wire.

4. An apparatus as set forth in claim 1, wherein each of said first and second insulation rotating means includes a pair of parallel bar members adapted to be brought into contact with said supplied wire on opposite sides thereof and then moved in opposite directions to impart rotation to said insulation.

5. An apparatus as set forth in claim 4, wherein each of said first and second insulation rotating means includes;
   means for driving one of said bar members in one direction, and
   means for converting the motion driving said one bar member in said one direction into an oppositely directed motion and imparting the latter to the other bar member.

6. An apparatus as set forth in claim 5, wherein said means for driving said one bar member of each of said first and second insulation rotating means in said one direction includes cam means, the configuration of said cam means being selected such as to determine the period of time of said rotating operation.

7. An apparatus for continuously producing pieces of insulated wire with stripped, twisted ends, comprising wire cutting means, first means for driving said wire cutting means toward and away from a severing position for cutting insulated wire advancing intermittently in a given wire advance direction, into a plurality of wire pieces of predetermined length, first and second insulation cutting means arranged upstream and downstream of said severing position as viewed in said wire advance direction, second means operatively connected to said insulation cutting means for driving said first and second insulation cutting means toward and away from said wire, first and second insulation rotating means also arranged upstream and downstream of said severing position, third means for driving said first and second insulation rotating means toward and away from said wire, and wire clamping means arranged to pull the cut wire length and the wire in said wire advance direction and in a direction opposite to said wire advance direction, respectively, while said first and second insulation cutting means have been driven toward said wire and fourth means for driving said clamping means to effect the pulling operation, whereby after a severing, the insulation is removed from the rear end, as viewed in the advance direction of a severed piece and the insulation at the forward end of the continuous wire is also removed, and the wire at both said ends is simultaneously twisted, said drive means being synchronized for a timed cooperation so that the wire cutting means are retracted from said severing position and thus moved out of the way while the insulation cutting means still hold the wire against rotation during the stripping operation of said insulation rotating means.

\* \* \* \* \*